US012512662B2

(12) United States Patent
Griffiths et al.

(10) Patent No.: US 12,512,662 B2
(45) Date of Patent: Dec. 30, 2025

(54) DC MOTOR DRIVEN BY CLASS 4 FAULT-MANAGED POWER INTEGRATED INTO A LOW-VOLTAGE DRIVE

(71) Applicant: Rockwell Automation Technologies, Inc., Mayfield Heights, OH (US)

(72) Inventors: Scott Griffiths, Port Washington, WI (US); David D. Brandt, New Berlin, WI (US); Michael Cook, Mequon, WI (US); Arun Guru, Mequon, WI (US); Jon Vanderpas, Appleton, WI (US); Robert Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 152 days.

(21) Appl. No.: 18/545,947

(22) Filed: Dec. 19, 2023

(65) Prior Publication Data

US 2025/0202223 A1   Jun. 19, 2025

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC ................................ H02H 3/16; H02H 1/0007
See application file for complete search history.

(56) References Cited

U.S. PATENT DOCUMENTS

| 8,068,937 B2 | 11/2011 | Eaves |
| 8,781,637 B2 | 7/2014 | Eaves |
| 9,184,795 B2 | 11/2015 | Eaves |
| 9,419,436 B2 | 8/2016 | Eaves et al. |
| 9,853,689 B2 | 12/2017 | Eaves |
| 9,893,521 B2 | 2/2018 | Lowe et al. |
| 10,468,879 B2 | 11/2019 | Eaves |
| 10,541,543 B2 | 1/2020 | Eaves |
| 10,714,930 B1 | 7/2020 | Weiss et al. |

(Continued)

FOREIGN PATENT DOCUMENTS

| EP | 2929607 B1 | 9/2020 |
| WO | 2018178990 A1 | 10/2018 |

(Continued)

*Primary Examiner* — Scott Bauer

(57) ABSTRACT

The present technology relates to fault-managed power (FMP), and particularly, to generating FMP in an industrial automation environment using single-pair Ethernet (SPE) cabling for use by DC motors. An FMP system may include a transmitter circuit and receiver circuits coupled together via a transmission link formed using SPE cable. The transmitter circuit can generate a FMP and transmit a pulsed signal having the FMP to the receiver circuits. The transmitter circuitry can also exchange data signals with the receiver circuits over a communication channel using the SPE cable. The receiver circuits can identify an expected power consumption of DC motors coupled to the receiver circuits and provide an indication of the expected power consumption to the transmitter circuit. The transmitter circuit can detect a fault based on a comparison between the transmitted FMP and the power consumption and terminate transmission of the FMP in response to detecting the fault.

20 Claims, 7 Drawing Sheets

(56) References Cited

U.S. PATENT DOCUMENTS

| | | |
|---|---|---|
| 2017/0229886 A1 | 8/2017 | Eaves |
| 2018/0313886 A1 | 11/2018 | Mlyniec et al. |
| 2020/0295559 A1 | 9/2020 | Eaves et al. |
| 2021/0063447 A1 | 3/2021 | Eaves |
| 2021/0263545 A1 | 8/2021 | Goergen et al. |
| 2022/0032804 A1 | 2/2022 | Goergen et al. |
| 2023/0299661 A1* | 9/2023 | Lumanog ............ H02M 1/0009 323/284 |
| 2023/0378938 A1* | 11/2023 | Bolouri-Saransar ..... H04B 3/54 |
| 2024/0168533 A1* | 5/2024 | Arduini ................. G06F 1/3206 |
| 2024/0421593 A1* | 12/2024 | Shea ....................... H02J 1/084 |
| 2025/0096603 A1* | 3/2025 | Castro .................... G01R 31/52 |

FOREIGN PATENT DOCUMENTS

| | | |
|---|---|---|
| WO | 2020227045 A1 | 11/2020 |
| WO | 2022015536 A1 | 1/2022 |
| WO | 2022066272 A1 | 3/2022 |
| WO | 2022081778 A1 | 4/2022 |

\* cited by examiner

DC MOTOR DRIVEN BY CLASS 4 FAULT-MANAGED POWER INTEGRATED INTO A LOW-VOLTAGE DRIVE

RELATED APPLICATIONS

This application is related to U.S. patent application Ser. No. 18/545,855 titled "FAULT-MANAGED POWER VIA BLACK-CHANNEL SAFETY PROTOCOL", filed concurrently with this application and U.S. patent application Ser. No. 18/389,593 titled "FAULT-MANAGED POWER FOR DISTRIBUTED DRIVES", filed concurrently with this application, which are both hereby incorporated by reference in their entirety.

TECHNICAL FIELD

Various embodiments of the present technology relate to fault-managed power, and particularly, to generating fault-managed power in an industrial automation environment.

BACKGROUND

Fault-managed power is a class of commercial power under the National Electric Code (NEC) in the United States that includes the use of a transmitter and a receiver to transfer power over low-voltage cable and monitor such power for faults that may cause harm to people, structures, or devices. Fault-managed power falls under Class 4 power and therefore can only include a transmission of 450 V or less. Further requirements under the NEC related to Class 4 power require a fault-managed power transmitter to detect various types of faults, including short-circuits, line-to-line faults, line-to-ground faults, overcurrent, malfunction in monitoring components, and any other condition that may cause fire or shock.

Various fault-managed power solutions exist today to convert and transfer grid power over low-voltage cabling. For example, one fault-managed power solution provides pulsed fault-managed power to a receiver. When the transmission of power is "on," the receiver receives the fault-managed power. When the transmission of power is "off," the transmitter does not send power, but rather, the transmitter measures the state of a transmission line to evaluate for faults. In another example, a transmitter sends fault-managed power over a transmission line to a receiver. The receiver, however, does not communicate back to the transmitter using the same transmission line. Rather, the receiver and transmitter communicate with each other using a mesh network.

SUMMARY

Systems, devices, and methods are provided herein for generating fault-managed power transmittable from a transmitter to a receiver as a pulsed signal using single-pair Ethernet cabling. An industrial or commercial environment may include various industrial automation devices, such as variable-speed drives, motors, and the like, that perform industrial automation processes. Such devices require power to perform industrial or automation operations, however, traditional power delivered to these devices may be limited with respect to safety and voltage. Rather, fault-managed power, or class 4 power, can provide higher voltages to industrial devices using cost-effective and longer, flexible cables with built-in safety mechanisms to detect line-to-line and line-to-ground faults, among other types of faults. The fault-managed power can be monitored by both the transmitter and the receiver to determine whether loads, or the industrial devices, are receiving acceptable amounts of power required for specific operations.

In an embodiment of the present technology, a system for producing fault-managed power, driving DC motors with the fault-managed power, and detecting faults within the fault-managed power system and DC motors is provided. A fault-managed power system may include a transmitter circuit and receiver circuits coupled together via a transmission link formed using SPE cable. The transmitter circuitry can generate a FMP and transmit a pulsed signal having the FMP to the receiver circuits. The transmitter circuit can also exchange data signals with the receiver circuits over a communication channel using the SPE cable. The receiver circuits can identify an expected power consumption of DC motors coupled to the receiver circuits and provide an indication of the expected power consumption to the transmitter circuit. The transmitter circuit can detect a fault based on a comparison between the transmitted FMP and the power consumption and terminate transmission of the FMP in response to detecting the fault.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1A:
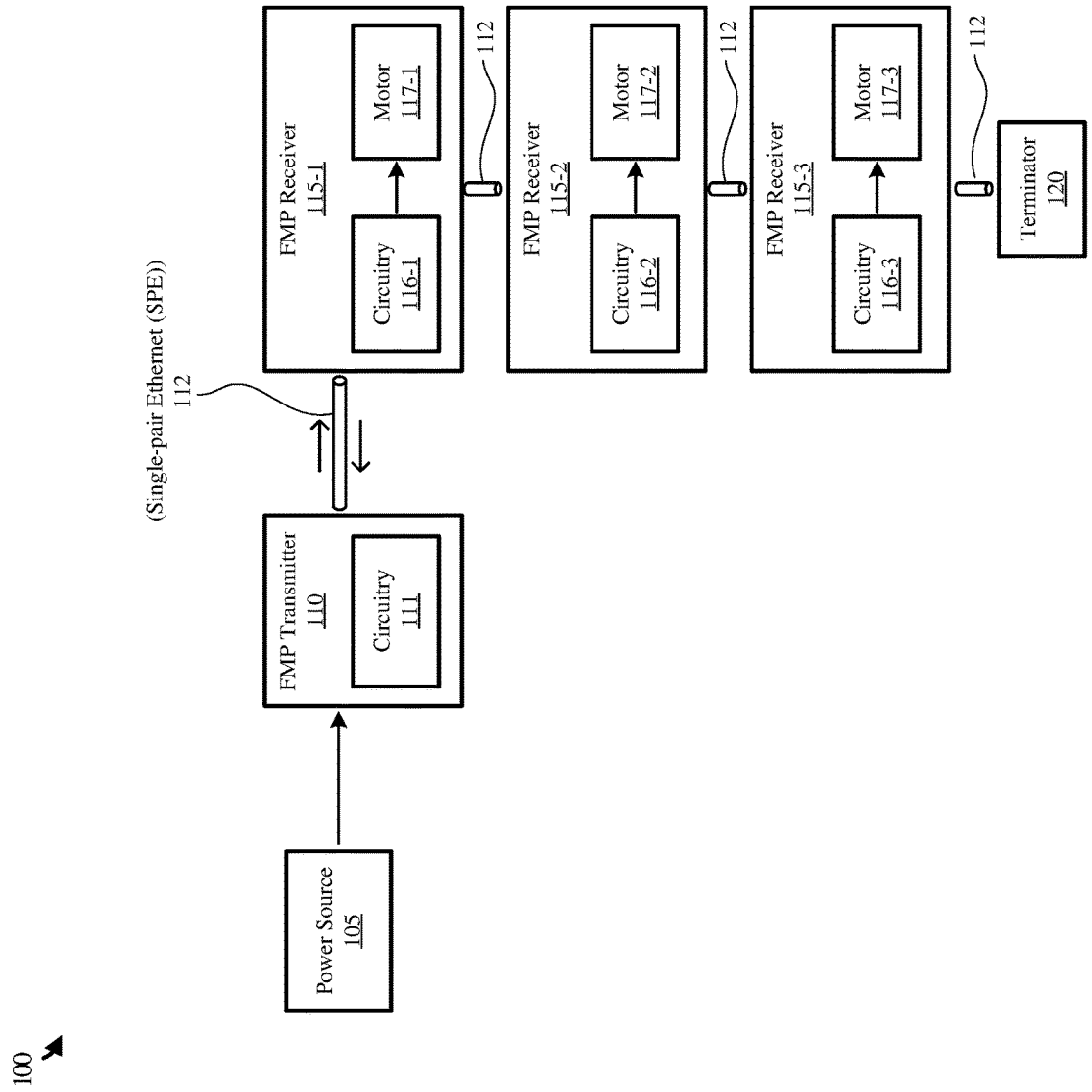
FIGS. 1A and 1B illustrate example operating environments in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate to producing and transmitting fault-managed power for use in an industrial automation environment, and more particularly, to providing pulsed power from a transmitter to a receiver using single-pair Ethernet cabling for operation of one or more DC motors. In an industrial or commercial environment, industrial automation devices, such as variable-speed drives, motors, and the like, perform industrial automation processes and require power to perform such processes. Installation of traditional power systems requires professional installation and safety checks to ensure that AC mains electricity is properly driven to the devices and systems in an environment. Such power systems often limit the distance between the power source and the load (e.g., a DC motor) due to some intolerance to voltage drops in cabling. Further, such cabling generally requires conduit and specific installation to prevent harm to other people or equipment. Despite this safety restriction, Class 1 power does not require line-to-line fault protection to be monitored.

To address these issues, a fault-managed power system can employ a transmitter, one or more receivers, and low-voltage cabling (such as single-pair Ethernet (SPE)) to generate fault-managed power for use by one or more motors. Fault-managed power (FMP) is classified as Class 4 power under the NEC. Thus, it requires fault-detection of line-to-line faults, among other types of faults. The fault-managed power can be generated from AC mains power, or from DC power, and transmitted across the SPE continuously. The receiver(s) can use the fault-managed power to drive one or more motors operating in an industrial automation environment. By using FMP, conduit and other heavy-duty protection mechanisms can be avoided. Rather, FMP can be installed in cable trays and raceways along with other data cables to reduce installation costs. In some FMP systems, data and communications can also be provided between the transmitter and receivers.

In an embodiment of the present technology, a system for producing fault-managed power, driving DC motors with the fault-managed power, and detecting faults within the fault-managed power system and DC motors is provided. A fault-managed power system may include a transmitter circuit and receiver circuits coupled together via a transmission link formed using SPE cable. The transmitter circuit can generate a FMP and transmit a pulsed signal having the FMP to the receiver circuits. The transmitter circuit can also exchange data signals with the receiver circuits over a communication channel using the SPE cable. The receiver circuits can identify an expected power consumption of DC motors coupled to the receiver circuits and provide an indication of the expected power consumption to the transmitter circuit. The transmitter circuit can detect a fault based on a comparison between the transmitted FMP and the power consumption and terminate transmission of the FMP in response to detecting the fault.

In another embodiment, a method of operating a fault-managed power system is provided. The method includes receiving, by a fault-managed power transmitter, power from a power source, generating a fault-managed power based on the power, transmitting, by a fault-managed power transmitter a pulsed signal including the fault-managed power to one or more fault-managed power receivers via a transmission link formed using single-pair Ethernet cable, and establishing, by a fault-managed power transmitter, a continuous communication channel with the one or more fault-managed power receivers using the single-pair Ethernet cable for exchanging data signals. The method further includes receiving, at the fault-managed power transmitter, an indication of expected power consumption from the one or more fault-managed power receivers via the continuous communication channel and detecting, by a fault-managed power transmitter, a fault based on a comparison between the transmitted fault-managed power and the expected power consumption. In response to detecting the fault, transmission of the fault-managed power may be terminated.

Optionally, in such embodiments, the pulsed signal may have a maximum duty cycle such as 75%. Each of the receiver circuits may be configured to measure current of a respective motor driven by the FMP and to determine the power consumption based on the measured current. The transmitter circuit includes a transmitter physical layer, each of the receiver circuits includes a receiver physical layer, and the continuous communication channel established between the physical layers. Within the continuous communication channel, data signals may be exchanged in accordance with a safety protocol (e.g., common industrial protocol, black-channel safety protocol). For example, the receiver circuits can provide the power consumption via the communication channel with a packet transmission speed in accordance with the safety protocol. The transmitter circuitry may be configured to detect the fault based on a delay in receiving the indication of the power consumption beyond a threshold time. If there is no fault, the receiver circuits may include converter circuitry configured to convert the fault-managed power into a motor power and may include an interface configured to provide the motor power to the respective motor.

Advantageously, the disclosed system can provide uninterrupted, high-voltage fault-managed power to drive motors operating in an industrial or commercial environment, for example, while maintaining fire and shock safety. The system can use single-pair Ethernet (SPE) cabling to transmit the pulsed power signal that may function like a pulse-width modulated (PWM) signal to power one or more motors while also allowing continuous transmission of data and communications that can ride over the power transmitted through the SPE cabling. The system can operate in accordance with one or more safety protocols, such that the transmission of data and communications can occur within threshold time frames to prevent fire, shock, or other risk if a fault is detected in one or more of the receiver circuits, respective motors, or elsewhere in the system. Not only does the fault-managed power system improve device and system performance in an industrial automation environment, but also it can reduce installation cost and risk and increase control over power to individual motors and receivers by providing the ability to terminate transmission of the fault-managed power at the receiver or line level.

Figure 1B:
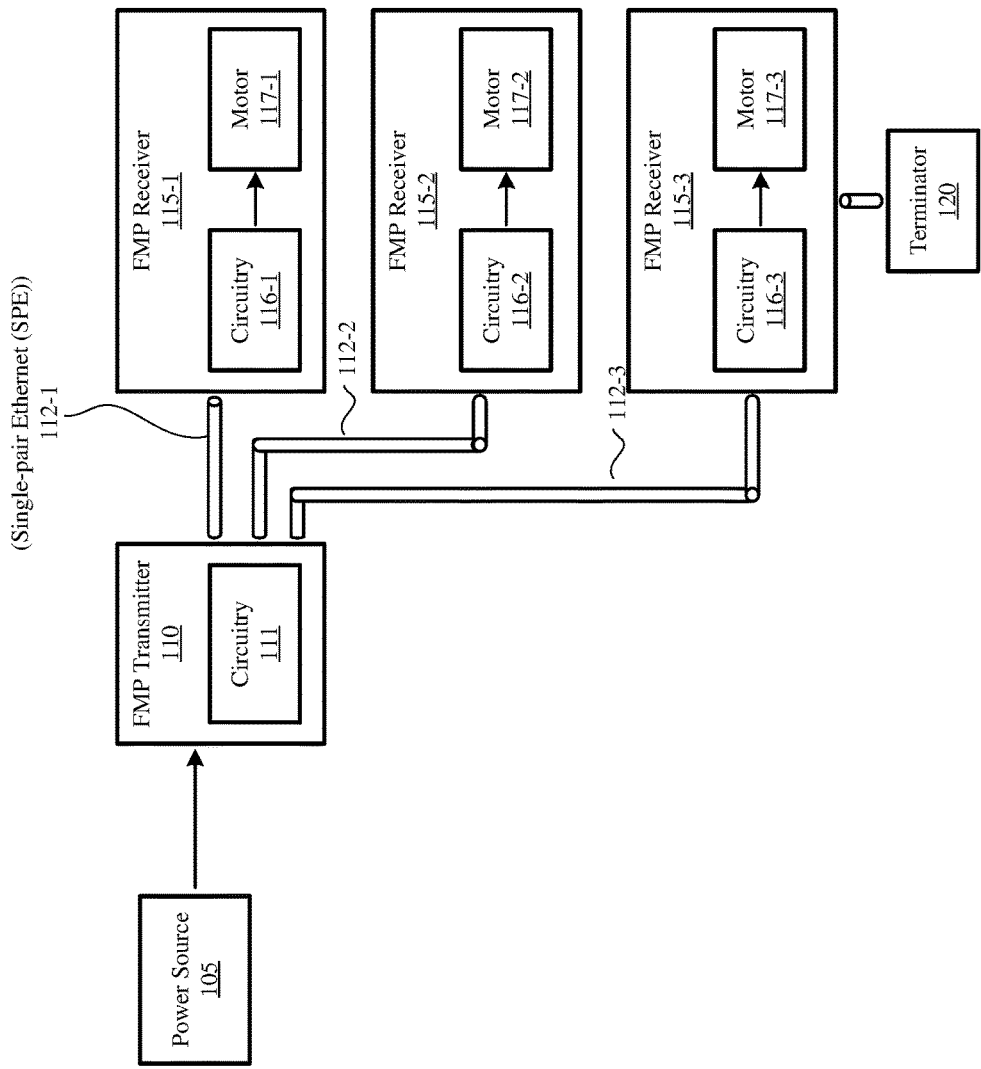

Turning now to the Figures, FIGS. 1A and 1B illustrate example operating environments in accordance with some embodiments of the present technology. FIG. 1A includes operating environment 100, which is representative of an environment in which industrial and commercial processes may be performed, and in which power can be converted from one form of power to fault-managed power for transmission over a transmission line for use by devices in the environment. Operating environment 100 includes power source 105, fault-managed power (FMP) transmitter 110, fault-managed power (FMP) FMP receivers 115-1, 115-2, and 115-3 (collectively FMP receivers 115), and terminator 120 arranged in a multi-drop topology. FMP transmitter 110 further includes circuitry 111, FMP receiver 115-1 further includes circuitry 116-1 and motor 117-1, FMP receiver 115-2 further includes circuitry 116-2 and motor 117-2, and FMP receiver 115-3 further includes circuitry 116-3 and motor 117-3. In various examples, FMP transmitter 110 may be configured to perform fault-managed power processes, such as process 500 of FIG. 5. FIG. 1B includes operating environment 101, which is also representative of an environment in which industrial and commercial processes may be performed, and in which power can be converted from one form of power to fault-managed power for transmission over a transmission line for use by devices in the environment. Operating environment 101 includes the same elements as operating environment 100, however, power and communications transmissions between FMP transmitter 110 and FMP receivers 115 may be arranged in a star topology.

Referring first to FIG. 1A, power source 105 is representative of any alternating current (AC) or direct current (DC) power source. For example, power source 105 may be AC mains electricity or a DC source, such as a rectifier or fuel cell. In some examples, power source 105 may produce power categorized under Class 1 or Class 2 power of the NEC. Power source 105 may be coupled to FMP transmitter 110, or circuitry 111 of FMP transmitter 110, to provide power to FMP transmitter 110.

FMP transmitter 110 is representative of a device, apparatus, or circuitry capable of receiving power from power source 105, converting the power into fault-managed power, and transmitting the fault-managed power to FMP receivers 115 over a transmission link or line. FMP transmitter 110 may further be capable of establishing a continuous communication channel with FMP receivers 115 via the transmission line for exchanging data signals between FMP transmitter 110 and FMP receivers 115. To perform power conversion, power transmission, and communications, FMP transmitter 110 may include circuitry 111.

Circuitry 111 is representative of various electronic and electro-mechanical elements capable of interfacing with power source 105, converting the power from power source 105 to DC power or to AC power, generating fault-managed power from the DC or AC power, and transmitting both the fault-managed power and a communication indicating the transmission of the fault-managed power to FMP receivers 115. In various examples, circuitry 111 may include a microcontroller, one or more power converters, transformers, diodes, resistors, capacitors, and the like. The microcontroller may include one or more processors or processing units capable of communicating with FMP receivers 115, transmitting data and power to FMP receivers 115, and detecting a fault within FMP transmitter 110 or FMP receivers 115 during transmission of the fault-managed power. Examples of such processor(s) may include microcontrollers, DSPs, general purpose central processing units, application specific processors or circuits (e.g., ASICs), and logic devices (e.g., FPGAs), as well as any other type of processing device, combinations, or variations thereof.

FMP transmitter 110 and FMP receivers 115 are coupled via a transmission link formed using single-pair Ethernet (SPE) 112. SPE 112 may include a pair of conductors (i.e., wires). The pair of conductors may be used to transmit the fault-managed power from FMP transmitter 110 to FMP receivers 115 and exchange communications between FMP transmitter 110 and FMP receivers 115. In various examples, FMP transmitter 110 provides the fault-managed power to FMP receivers 115 over SPE 112 as a pulsed signal. In other words, FMP transmitter 110 generates a signal having a duty cycle less than 100%. In this way, FMP transmitter 110 provides the fault-managed power in a way that mimics a pulse-width modulated signal. FMP transmitter 110 may also establish a continuous communication channel using SPE 112. Communications and data between FMP transmitter 110 and FMP receivers 115 can transmit directly over the fault-managed power continuously, allowing FMP transmitter 110 to determine whether a fault has occurred at any point during transmission and reception of the fault-managed power.

FMP receivers 115 are representative of devices, apparatuses, or circuitry capable of receiving power from FMP transmitter 110, converting the power into power usable by motors 117, and providing an expected power consumption by motors 117 to FMP transmitter 110 over a continuous communication channel via SPE 112. As shown in operating environment 100, FMP receivers 115 may be coupled with FMP transmitter 110, via SPE 112, in a multi-drop topology. In other words, FMP receivers 115-1 may be coupled directly with FMP transmitter 110, FMP receivers 115-2 may be coupled with FMP receivers 115-1, and FMP receivers 115-3 may be coupled with FMP receivers 115-2. Fault-managed power and communications may flow through a single path from FMP transmitter 110 to FMP receivers 115-1 to FMP receivers 115-2 and to FMP receivers 115-3 and back to FMP transmitter 110. Terminator 120, representative of an electrical termination circuit for matching impedance of the fault-managed power and reducing cable losses, may also be included at the end of SPE 112, or coupled to FMP receivers 115-3. In this topology, if a fault is detected in any one of FMP receivers 115 or FMP transmitter 110, transmission of fault-managed power may be terminated such that none of FMP receivers 115 receive the fault-managed power.

If there are no faults in the fault-managed power system, FMP receivers 115 can receive the fault-managed power and provide the power to motors 117. In some examples, FMP receivers 115 may convert the fault-managed power to a different power (e.g., from DC to AC, from DC to DC) before providing the power to motors 117. To perform power conversion and transmission to motors 117 and to communicate with FMP transmitter 110 via the continuous communication channel, FMP receivers 115 may each include circuitry 116. More specifically, FMP receivers 115-1 includes circuitry 116-1 coupled to motor 117-1, FMP receivers 115-2 includes circuitry 116-2 coupled to motor 117-2, and FMP receivers 115-3 includes circuitry 116-3 coupled to motor 117-3.

Circuitry 116 is representative of various electronic and electro-mechanical elements capable of interfacing with motors 117, converting the fault-managed power to power appropriate for each of motors 117, and communicating expected power consumption by motors 117 to FMP transmitter 110. In various examples, circuitry 116-1, 116-2, and 116-3 may each include a microcontroller, one or more power converters, transformers, diodes, resistors, capacitors, and the like. The microcontrollers may include one or more processors or processing units capable of communicating with FMP transmitter 110 and transmitting data to FMP transmitter 110 during operation. Examples of such processor(s) may include microcontrollers, DSPs, general purpose central processing units, application specific processors or circuits (e.g., ASICs), and logic devices (e.g., FPGAs), as well as any other type of processing device, combinations, or variations thereof. Circuitry 111 and 116 may also be referred to as FMP circuitry, FMP circuits, circuitry, and/or circuits.

Motors 117 are representative of any type of motors operating in an industrial, commercial, industrial automation, or similar environment. Examples of motors 117 may include DC motors, AC motors, brushless motors, servomotors, or the like. In various examples, motors 117 are DC motors that can operate using the pulsed fault-managed power provided by FMP transmitter 110. Motors 117 can be coupled to receive the fault-managed power from circuitry 116 and can further be coupled to provide power to different downstream industrial or commercial devices that may be used to perform processes in the environment (not shown). Based on respective processes performed by the downstream devices, motors 117 may require different amounts of power. FMP receivers 115 may determine the amount of power required for each of motors 117. The total amount of power required by motors 117 may be referred to as the expected power consumption.

In operation, FMP receivers 115 determine the expected power consumption of motors 117. FMP receivers 115 provide, via the continuous communication channel over SPE 112, the expected power consumption to FMP transmitter 110. FMP transmitter 110 performs a comparison between the fault-managed power and the expected power consumption and determines whether there is a fault based on the comparison. More specifically, FMP transmitter 110 can determine that there is a fault if the difference between the expected power consumption and the fault-managed power exceeds a threshold amount. In some cases, FMP transmitter 110 may compare the expected power consumption to the fault-managed power less other power loss in circuitry 111, such as dissipation from electrical components. If FMP transmitter 110 determines that there is a fault, FMP transmitter 110 can immediately cease transmission of the fault-managed power to FMP receivers 115, and consequently, FMP receivers 115 can stop providing power to motors 117. The fault may include one or more of a line-to-line fault, a line-to-ground fault, a malfunction in FMP transmitter 110 or FMP receivers 115, over-current, short-circuit, or any other issue that could cause shock or fire to people, structures, or components of operating environment 100, among other things.

Referring next to FIG. 1B, operating environment 101 includes FMP transmitter 110 and FMP receivers 115 arranged in a star topology with respect to communications and power transmission. In this topology, each of FMP receivers 115 may be individually coupled to FMP transmitter 110 using SPE 112. FMP receiver 115-1 may be coupled to FMP transmitter 110 using SPE 112-1, FMP receiver 115-2 may be coupled to FMP transmitter 110 using SPE 112-2, and FMP receiver 115-3 may be coupled to FMP transmitter 110 using SPE 112-3. Power transmission and continuous communications may occur between FMP transmitter 110 and each of FMP receivers 115 individually. It follows that a fault occurring at one of FMP receivers 115 may cause FMP transmitter 110 to cease transmission of the fault-managed power to the faulted receiver but not the other receivers.

In other embodiments, FMP transmitter 110 and FMP receivers 115 may be coupled using SPE 112 in other topologies. For example, FMP transmitter 110 and FMP receivers 115 may be arranged in the linear topology with respect to power transmission as well as communications transmission. In such an example, a fault detected in one of FMP receivers 115, such as FMP receivers 115-1, may not affect power or communications transmissions in other FMP receivers 115, or FMP receivers 115-2 and 115-3. In another example, FMP transmitter 110 and FMP receivers 115 may be arranged in a linear topology with respect to communications and a multi-drop topology with respect to power transmission. If there is a fault at either FMP transmitter 110 or one of FMP receivers 115-1, 115-2, or 115-3, transmission of the fault-managed power via SPE 112 may be terminated, however, communications via SPE 112 may not be terminated despite the termination of power. Advantageously, communications may not be lost or terminated in the event of a fault. It may be further appreciated that any number of FMP receivers 115 and respective circuitry 116 and motors 117 may be included in a system.

Figure 2:
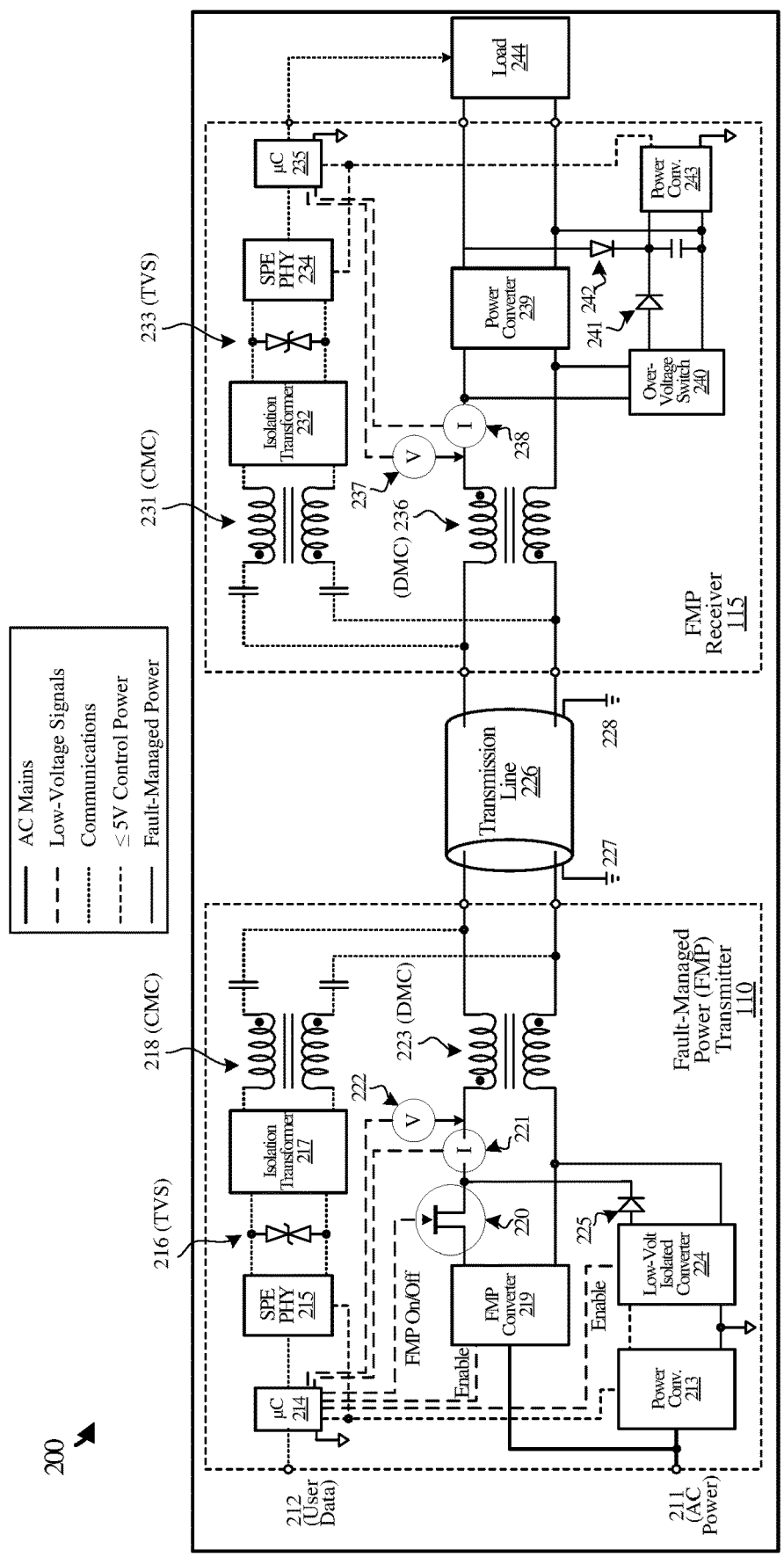
FIG. 2 illustrates an example block diagram of a fault-managed power system in accordance with some embodiments of the present technology.

FIG. 2 illustrates an example block diagram of a fault-managed power system in accordance with some embodiments of the present technology. FIG. 2 includes system 200, which includes fault-managed power (FMP) transmitter 110, transmission line 226, FMP receiver 115, and load 244. FMP transmitter 110 includes various elements, such as power converter 213, microcontroller (denoted as μC in FIG. 2) 214, single-pair Ethernet physical layer (SPE PHY) 215, transient voltage suppression (TVS) 216, isolation transformer 217, common mode choke (CMC) 218, FMP converter 219, differential mode choke (DMC) 223, and low-voltage isolated converter 224, among other elements, which may be representative of circuitry 111. FMP receiver 115 includes various elements, such as DMC 236, CMC 231, isolation transformer 232, SPE PHY 234, microcontroller 235, power converter 239, over-voltage switch 240, and power converter 243, which may be representative of circuitry 116. In various examples, FMP transmitter 110 and FMP receiver 115 may exemplify fault-managed power components capable of performing fault-managed power processes, such as process 500 of FIG. 5.

System 200 is representative of a fault-managed power system capable of converting AC or DC power from a power source into fault-managed power to be transmitted over low-voltage cabling, as opposed to conventional electrical transmission cabling, for use downstream. More specifically, FMP transmitter 110 can obtain AC or DC power, convert the power to fault-managed power, and provide the fault-managed power to FMP receiver 115. FMP receiver 115 uses the fault-managed power to provide one or more loads (e.g., load 244) power to operate.

Fault-managed power (FMP) transmitter 110 is representative of a device, apparatus, or circuitry capable of receiving AC power 211 from a power source, converting the power into fault-managed power, and transmitting the fault-managed power to FMP receiver 115 over a transmission line 226. FMP transmitter 110 may further be capable of establishing a continuous communication channel with FMP receiver 115 via transmission line 226 for exchanging data signals between FMP transmitter 110 and FMP receiver 115. To perform power conversion and transmission, FMP transmitter 110 includes various circuits, devices, and other components. More particularly, FMP transmitter 110 may control the circuits, devices, and other components and operations of such elements using microcontroller 214. FMP transmitter 110 may initiate transmission of fault-managed power and communications following a start-up phase, which is described below with respect to FIG. 4.

Microcontroller 214 is representative of one or more processors or processing units capable of communicating with (i.e., via communications signals denoted by thin, dotted lines in FIG. 2) and controlling (i.e., via low-voltage signals denoted by thick, dashed lines in FIG. 2) components of FMP transmitter 110 and components of FMP receiver 115. For example, microcontroller 214 may be coupled with SPE PHY 215, FMP converter 219, power converter 213, and low-voltage isolated converter 224. Microcontroller 214 may perform one or more predetermined, or pre-programmed, operations to communicate with and control such components. Microcontroller 214 may also, or instead, receive user data 212 that may direct microcontroller 214 to perform such operations. In various examples, microcontroller 214 may also include Ethernet switching circuitry, such as a communications switch or bridge.

User data 212 may include user-defined signals that include parameters associated with other components of FMP transmitter 110, threshold values related to current and voltage of the fault-managed power, instructions for enabling or disabling transmission of the fault-managed power or components of FMP transmitter 110, and the like. User data 212 may also include data unrelated to the operations of FMP transmitter 110 and FMP receiver 115, such as data to and from load 244 (e.g., industrial devices 120) or to and from a programmable logic controller (PLC) (not shown) coupled to load 244. In an initial start-up phase of FMP transmitter 110, microcontroller 214 may disable the generation of fault-managed power so that the fault-managed power cannot be transmitted to receiver 115 until other elements are initialized. For example, microcontroller 214 may first provide internal control power (denoted by the thin, dashed line in FIG. 2) to power converter 213 so that power converter 213 can receive AC power 211 and operate to convert AC power 211 to a value usable by FMP transmitter 110.

AC power 211 includes power from AC mains, such as a power grid, or any other source capable of producing AC power (e.g., power source 105 of FIG. 1A). In some examples, AC power 211 may qualify as Class 1 or Class 2 power of the NEC. In other cases, however, AC power 211 may be a different class of power, or alternatively, transmitter 110 may receive DC power instead of AC power 211. FMP transmitter 110 receives AC power 211 at power converter 213 and at FMP converter 219 (denoted by the bolded solid line in FIG. 2).

Power converter 213 is representative of an AC-to-DC or DC-to-AC power converter capable of intaking AC power 211 and converting AC power 211 to a different AC value or to DC power. In some examples, power converter 213 may output an increased power, however, in other examples, power converter 213 may output a decreased power with respect to AC power 211. Power converter 213 may output a converted power to low-voltage isolated converter 224.

Low-voltage isolated converter 224 is representative of a power converter that may be capable of converting power output by power converter 213 to a low-voltage control power. In various examples, the low-voltage control power is DC power that may be provided over transmission line 226 to FMP receiver 115 to power-on components of FMP receiver 115 like power converter 243, microcontroller 235, and other components. The low-voltage control power may pass through diode 225 to further power-on current sensor 221 and voltage sensor 222.

After microcontroller 214 initializes components, such as power converter 213 and low-voltage isolated converter 224 of FMP transmitter 110, microcontroller 214 can check voltage and current values of signals on transmission line 226, via voltage sensor 222 and current sensor 221, to determine if power converter 213 and low-voltage isolated converter 224 are producing expected values.

Current sensor 221 and voltage sensor 222 are coupled between FMP converter 219 and DMC 223 to obtain current and voltage measurements at transmission line 226, respectively. It follows that current sensor 221 and voltage sensor 222 are sensors or devices capable of reading current values and voltage values, respectively. Microcontroller 214 can read the measurements as current passes through the sensors and can detect a fault in FMP transmitter 110 or FMP receiver 115 based on the measurements read by current sensor 221 and voltage sensor 222. In various examples, low-voltage isolated converter 224 may be designed to generate a 3.3 V output. Thus, microcontroller 214 may obtain measurements from voltage sensor 222 to determine whether the output meets or is approximately equal to the expected output of 3.3 V. Similarly, microcontroller 214 may determine an expected current by dividing the voltage from low-voltage isolated converter 224 by a resistance value associated with cables used in FMP transmitter 110. In some examples, the resistance values may be pre-programmed cable resistance determined at the time of design. In other examples, microcontroller 214 may use SPE PHY 215 to measure transmission line resistance.

SPE PHY 215 is representative of a physical layer that may provide an interface between FMP transmitter 110 and FMP receiver 115. More specifically, SPE PHY 215 may interface with SPE PHY 234 of FMP receiver 115 to establish a continuous communication channel. SPE PHY 234 is also representative of a physical layer for microcontroller 235. SPE PHYs 215 and 234 may perform negotiations and hand-shakes between each other to establish communication between microcontrollers 214 and 235. SPE PHYs 215 and 234 may also provide user data 212 between each other. SPE PHYs 215 and 234 communicate with each other via transmission line 226. Microcontroller 214, via SPE PHY 215 provides communications (denoted by the thin, dotted lines in FIG. 2) through TVS 216, isolation transformer 217, and CMC 218, which may provide filtering of data and communication signals when transmitting communications from microcontroller 214 to microcontroller 235. Similarly, microcontroller 235 receives and transmits communications, via SPE PHY 234, through TVS 233, isolation transformer 232, and CMC 231, which provide similar functionality.

In various examples, SPE PHYs 215 and 234 form a black channel over which a safety protocol, such as a black-channel safety protocol, a common industrial protocol (CIP), or another type of safety protocol, that meets packet transmission requirements and security requirements of a design may be used. If the measurements from current sensor 221 or voltage sensor 222 do not meet the expected values, microcontroller 214 can detect a fault and disable low-voltage isolated converter 224 and attempt to restart operations of power converter 213 and low-voltage isolated converter 224. If the measurements meet the expected values, SPE PHY 215 may initiate communications with FMP receiver 115 to ensure there are no faults at FMP receiver 115.

Transmission line 226 is representative of cabling used to physically couple FMP transmitter 110 and FMP receiver 115 (e.g., SPE 112 of FIG. 1A). In various examples, transmission line 226 is formed using single-pair Ethernet (SPE). SPE may include a pair of conductors (i.e., wires). Both conductors of the SPE may be used to transmit the fault-managed power from FMP transmitter 110 to FMP receiver 115 and to transmit data and communications simultaneously, such as user data 212, expected power consumption, and other information communicable via SPE PHYs 215 and 234. With SPE, full-duplex communications (i.e., communication in both directions) can occur as electrical signals transmitted over the conductors may be superimposed over power signals. In various examples, echo cancellation techniques may be used by FMP transmitter 110 and FMP receiver 115 so that signals leaving a respective SPE PHY do not return to the same SPE PHY's receiver circuitry. Transmission line 226 may also be coupled to ground nodes 227 and 228.

After low-voltage isolated converter 224 provides the low-voltage signal to FMP receiver 115, the low-voltage signal can pass through over-voltage switch 240, through diode 241, and to power converter 243. Over-voltage switch 240 is representative of a switch that allows or prevents current flow to power converter 243 based on the low-voltage signal provided by FMP transmitter 110. Similarly, over-voltage switch 240 and diode 241 may prevent current from flowing from power converter 243 to transmission line 226.

Power converter 243 is representative of a low-voltage power converter that performs DC-to-DC power conversion using the low-voltage power provided by FMP transmitter 110 and provides the converted DC power to power microcontroller 235 of FMP receiver 115, among other components of FMP receiver 115.

Microcontroller 235, like microcontroller 214 is representative of one or more processors or processing units capable of communicating with (i.e., via communications signals denoted by thin, dotted lines in FIG. 2) and controlling (i.e., via low-voltage signals denoted by thick, dashed lines in FIG. 2) components of FMP receiver 115, and further, communicating data and information to FMP transmitter 110. Microcontroller 235 may also include Ethernet switching circuitry, such as a communications switch or bridge, which may support the reception and distribution of communications between FMP receiver 115 and load 244. In an example, microcontroller 235 may be coupled with SPE PHY 234, power converter 239, and load 244. Via SPE PHYs 234 and 215, microcontroller 235 may be directed to measure line voltage and current on transmission line 226 using voltage sensor 237 and current sensor 238, representative of sensors capable of measuring values of voltage and current, respectively. Microcontroller 235 can provide such measurements to microcontroller 214 via SPE PHY 234.

Microcontroller 235 can check for several conditions with respect to the measured current and voltage at FMP receiver 115. For example, microcontroller 235 can determine whether the voltage at transmission line 226 in FMP receiver 115 meets or exceeds a threshold value (e.g., 3.3 V). Microcontroller 235 can also determine whether the current at transmission line 226 in FMP receiver 115 meets or exceeds a threshold value. Further, microcontroller 235 can compare the current measured at FMP receiver 115 via current sensor 238 and the current measured at FMP transmitter 110 via current sensor 221 to determine whether the current values are equal, or approximately equal, to each other within a threshold error value. Additionally, microcontroller 235 can compare the power transmitted from FMP transmitter 110 is equal, or approximately equal, to the power received at FMP receiver 115 within a threshold error value. If microcontroller 235 determines that all of the above conditions are met, microcontroller 235 can provide an indication of success to microcontroller 214 via SPE PHYs 215 and 234. If microcontroller 235 determines that one or more of the above conditions are not met, microcontroller 235 can provide an indication of a fault to FMP transmitter 110. Upon receiving the indication of the fault, FMP transmitter 110 can disable low-voltage isolated converter 224 and repeat initialization of components of FMP transmitter 110.

In various examples, microcontroller 235 may check for such conditions for a pre-determined amount of time or for a pre-determined number of times in accordance with a safety protocol. Similarly, microcontroller 214 may employ a watchdog timer to ensure that microcontroller 235 is providing indications of success or fault within a threshold time. If microcontroller 214 determines that microcontroller 235 has not provided an indication in accordance with the threshold time, microcontroller 214 can determine that a fault has occurred, and microcontroller 214 can disable low-voltage isolated converter 224. Additionally, if microcontroller 214 determines that data has been lost on transmission from microcontroller 235 to microcontroller 214 (e.g., two or more packets in a row), microcontroller 214 can determine that a fault has occurred.

If microcontroller 214 does not detect any faults following initialization of the low-voltage signals and communication between microcontrollers 214 and 235, microcontroller 214 can direct FMP converter 219 to turn on to begin generating fault-managed power. FMP converter 219 is representative of an AC-to-DC power converter that can convert AC power 211 from the power source (denoted by the bolded, solid line in FIG. 2) to DC power of approximately 400 VDC. FMP converter 219 outputs the fault-managed power to FMP receiver 115 via transmission line 226.

Transistor 220 is coupled between FMP converter 219 and transmission line 226 and may prevent the fault-managed power from flowing to FMP receiver 115 if disabled. Microcontroller 214 is coupled to a gate of transistor 220 and can control whether the fault-managed power can flow through transistor 220 to FMP receiver 115 or not. For example, microcontroller 214 may cause transistor 220 to prevent the fault-managed power from passing through transistor 220 if microcontroller 214 detects a fault or determines that FMP receiver 115 is not yet powered-on, load 244 is not connected, or for some other reason. While transistor 220 is depicted as a single transistor, multiple transistors, or any other type of switching or gating device, may be used.

DMC 223 is also included on transmission line 226 within FMP transmitter 110. DMC 223 may be included to filter noise from the fault-managed power generated by FMP converter 219 before the fault-managed power is provided to FMP receiver 115 via transmission line 226. Similarly, DMC 236 is included on transmission line 226 within FMP receiver 115 and may filter noise from the fault-managed power before reaching power converter 239 and load 244.

In various examples, the fault-managed power generated by FMP converter 219 is provided to FMP receiver 115 as an unpulsed signal (i.e., 100% duty cycle; denoted by the thin, solid line in FIG. 2) via transmission line 226. While the fault-managed power is being transmitted to FMP receiver 115, microcontroller 235 can identify current and voltage measurements of the fault-managed power received at FMP receiver 115 via current sensor 238 and voltage sensor 237, respectively. Additionally, microcontroller 235 can identify an expected power consumption of the fault-managed power by load 244. Microcontroller 235 can provide the measurements and the expected power consumption to microcontroller 214 via SPE PHY 234 and in accordance with a safety protocol (i.e., within a pre-determined amount of time). Microcontroller 214 can check for several conditions with respect to the measured current and voltage of the fault-managed power at FMP receiver 115. For example, microcontroller 214 can determine whether the voltage at transmission line 226 in FMP receiver 115 is below a threshold value (e.g., 450 V). Microcontroller 214 can also determine whether the current at transmission line 226 in FMP receiver 115 is within a threshold range expected from FMP converter 219 based on the measurements provided to microcontroller 214. Further, microcontroller 214 can compare the current measured at FMP receiver 115 via current sensor 238 and the current measured at FMP transmitter 110 via current sensor 221 to determine whether the current values of the fault-managed power, before and after transmission, are equal, or approximately equal, to each other within a threshold error value. If not, this may indicate a fault as some, or all, of the current may be flowing elsewhere. Microcontroller 214 may also compare whether the power transmitted from FMP transmitter 110 is equal, or approximately equal, to the power received at FMP receiver 115 within a threshold error value. Additionally, microcontroller 214 can compare the expected power consumption with the amount of fault-managed power transmitted by FMP transmitter 110. If microcontroller 214 determines that all of the above conditions are met, microcontroller 214 can provide an indication of success to microcontroller 235 via SPE PHYs 215 and 234.

In various examples, microcontroller 235 may provide its measurements to microcontroller 214 according to a safety protocol with a packet interval less than or equal to a nominal packet interval (e.g., 0.5 millisecond). For example, when using one safety protocol, a set of measurements from microcontroller 235 must arrive at microcontroller 214 within a threshold time, which may be a fixed multiple of the nominal packet interval (e.g., four times a nominal 0.5 millisecond packet interval, thus within 2 milliseconds). If microcontroller 214 does not receive a fresh set of measurements from microcontroller 235 within the threshold time, microcontroller 214 can consider this a fault condition and open transistor 220, rapidly removing FMP from transmission line 226. The threshold time may be chosen such that the energy delivered by the FMP within this time interval is less than would be needed to cause human harm or ignite a fire.

Power converter 239 can receive the fault-managed power and convert the fault-managed power to a different DC power or to AC power for consumption by load 244. Power converter 239 is coupled to provide the converted fault-managed power to load 244. Load 244 is representative of one or more motors (e.g., a DC motor) operating in an industrial automation environment, commercial environment, or industrial environment. For example, load 244 may be representative of one of motors 117 of FIG. 1A. While load 244 is shown as a single box in FIG. 2, load 244 may include several loads, each coupled to FMP receiver 115 to receive fault-managed power.

While FMP converter 219 is enabled and transmitting the fault-managed power to FMP receiver 115, low-voltage isolated converter 224 may stay enabled, however, the low-voltage power may not transmit via transmission link 226 as diode 225, coupled between low-voltage isolated converted 224 and transmission link 226 may be reverse-biased and prevent the low-voltage power from flowing through diode 225 to transmission link 226.

If microcontroller 235 determines that one or more of the above conditions are not met, microcontroller 235 can provide an indication of a fault to FMP transmitter 110. Upon receiving the indication of the fault, FMP transmitter 110 can disable transistor 220 and/or FMP converter 219 to prevent transmission of the fault-managed power to FMP receiver 115. In FMP receiver 115, over-voltage switch 240 can prevent the fault-managed power from flowing to power converter 243 to prevent damage of power converter 243. Microcontroller 214 can wait a pre-determined amount of time or for user data 212 before beginning transmission of the fault-managed power again.

In various other examples, additional, fewer, or different components may be included in or coupled to FMP transmitter 110 and FMP receiver 115. Additionally, components thereof may be coupled or wired to each other in different manners, which may create different topologies or architectures. In other words, any combination or variation of circuitry in FMP transmitter 110 and FMP receivers 115 may be utilized to drive DC motors (e.g., motors 117) using pulsed signals over SPE.

Figure 3:
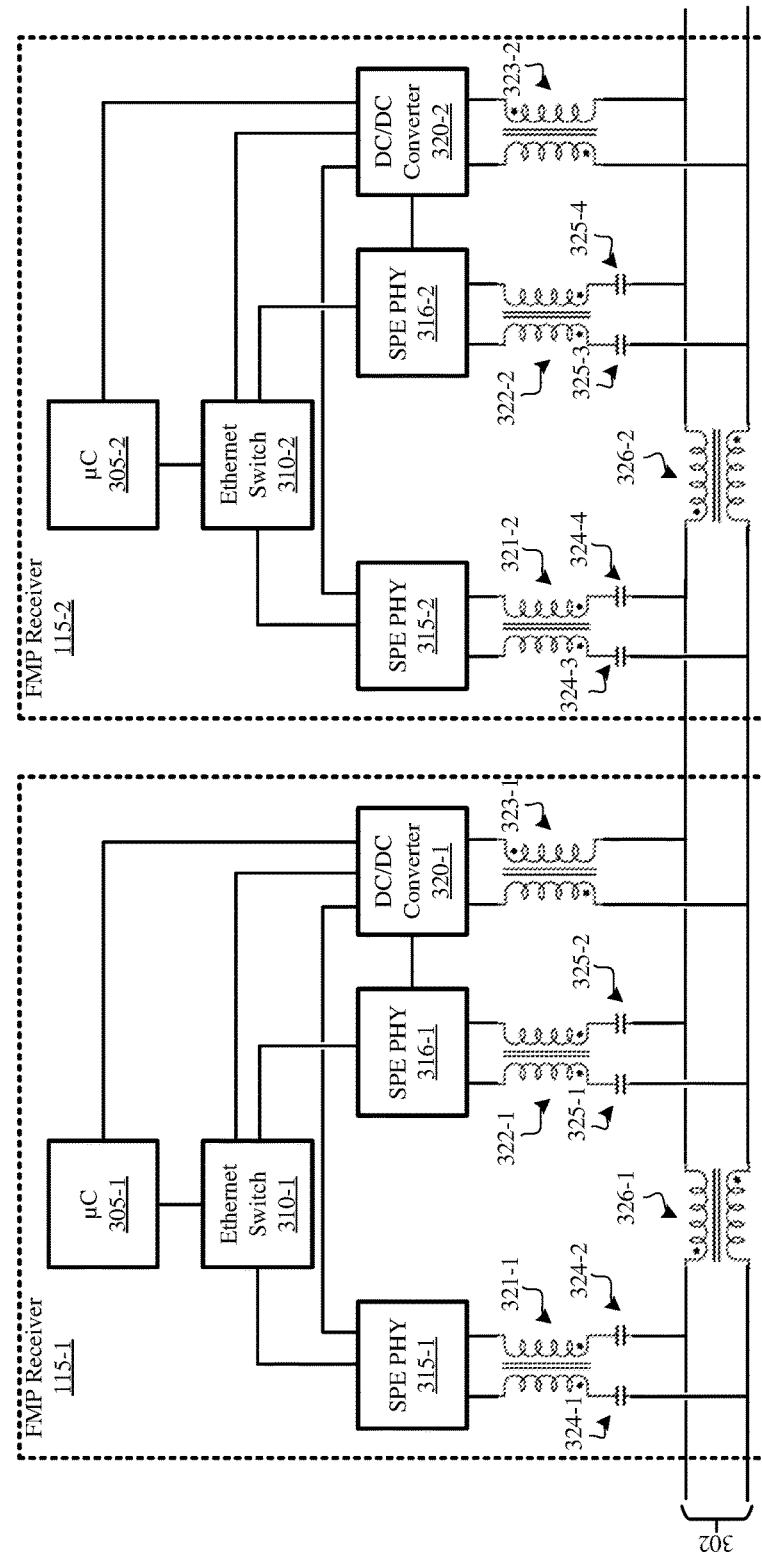
FIG. 3 illustrates an example block diagram of components of a fault-managed power system in accordance with some embodiments of the present technology.

FIG. 3 illustrates an example block diagram of components of a fault-managed power system in accordance with some embodiments of the present technology. FIG. 3 includes operating environment 300, which includes FMP receivers 115-1 and 115-2 coupled together via single-pair Ethernet (SPE) 302. FMP receiver 115-1 includes microcontroller (denoted by μC in FIG. 3) 305-1, Ethernet switch 310-1, SPE physical layer (PHY) 315-1, SPE PHY 316-1, DC/DC converter 320-1, common-mode choke (CMC) 321-1, CMC 322-1, differential-mode choke (DMC) 323-1, capacitors 324-1, 324-2, 325-1, and 325-2, and DMC 326-1, which may be representative of circuitry 111. Similarly, FMP receiver 115-2 includes microcontroller 305-2, Ethernet switch 310-2, SPE PHY 315-2, SPE PHY 316-2, DC/DC converter 320-2, CMC 321-2, CMC 322-2, DMC 323-2, capacitors 324-3, 324-4, 325-3, and 325-4, and DMC 326-2, which may be representative of circuitry 116.

FMP receivers 115-1 and 115-2 (collectively FMP receivers 115) may be representative of fault-managed receivers used in a fault-managed power system, such as two of FMP receivers 115 of FIG. 1A. In operating environment 300, FMP receivers 115-1 and 115-2 may be coupled in a multi-drop topology where FMP receiver 115-1 is coupled to a transmitter (e.g., FMP transmitter 110 of FIG. 1A) via a transmission line formed using SPE 302, and FMP receiver 115-2 is coupled to FMP receiver 115-1 along SPE 302. While only two receivers are shown, additional receivers may also be included and coupled along SPE 302. The transmitter may provide both fault-managed power and data signals to FMP receivers 115 using SPE 302.

SPE 302 is representative of low-voltage cabling including a pair of conductors that may be used to transmit and receive both power and data over the same pair of conductors. Accordingly, the pair of conductors may be used to transmit the fault-managed power from the transmitter to FMP receivers 115 and communications between the transmitter and FMP receivers 115. FMP receivers 115-1 and 115-2 include various components for receiving the fault-managed power and data and communications from the transmitter via SPE 302, such as SPE PHYs 315 and 316, DC/DC converters 320. Each conductor of SPE 302 may be coupled to different components of FMP receivers 115.

Specifically, a first conductor of SPE 302 may be coupled to capacitor 324-1, capacitor 325-1, and first terminals of DMCs 323-1 and 326-1 of FMP receiver 115-1 and capacitor 324-3, capacitor 325-3, and first terminals of DMCs 323-2 and 326-2 of FMP receiver 115-2. A second conductor of SPE 302 may be coupled to capacitor 324-2, capacitor 325-2, and second terminals of DMCs 323-1 and 326-1 of FMP receiver 115-1 and capacitor 324-4, capacitor 325-4, and second terminals of DMCs 323-2 and 326-2 of FMP receiver 115-2.

Each of the capacitors and CMCs of FMP receivers 115-1 and 115-2 may be included to prevent fault-managed power flowing through SPE 302 from reaching the SPE PHYs, as the fault-managed power may cause damage to the SPE PHYs, while also allowing communications flowing through SPE 302 to be received by and transmitted from the SPE PHYs. For example, capacitors 324-1 and 324-2 may be coupled to CMC 321-1, which is further coupled to SPE PHY 315-1. Capacitors 325-1 and 325-2 may be coupled to CMC 322-1, which is further coupled to SPE PHY 316-1. Capacitors 324-3 and 324-4 may be coupled to CMC 321-2, which is further coupled to SPE PHY 315-2. Capacitors 325-3 and 325-4 may be coupled to CMC 322-2, which is further coupled to SPE PHY 316-2.

Each of the DMCs of FMP receivers 115-1 and 115-2 may be included to filter noise in the electrical current flowing through SPE 302. For example, in FMP receiver 115-1, DMC 326-1 may be coupled along SPE 302 between various components of FMP receiver 115-1, and DMC 323-1 may be further coupled between SPE 302 and DC/DC converter 320-1. Likewise, in FMP receiver 115-2, DMC 326-2 may be coupled along SPE 302 between various components of FMP receiver 115-2, and DMC 323-2 may be further coupled between SPE 302 and DC/DC converter 320-2.

The SPE PHYs and DC/DC converters of FMP receivers 115-1 and 115-2 may each be coupled with Ethernet switches 310-1 and 310-2, respectively. Ethernet switches 310-1 and 310-2 may be included to establish a communication network and connect components of FMP receivers 115 to the communication network. Ethernet switches 310-1 and 310-2 may include a network switch and other network hardware and may be coupled with each of the SPE PHYs and DC/DC converters via low-voltage, Ethernet cables. Ethernet switches 310-1 and 310-2 may be controlled by microcontrollers 305-1 and 305-2, respectively.

The SPE PHYs may also be coupled with the DC/DC converters of FMP receivers 115-1 and 115-2. Specifically, SPE PHYs 315-1 and 316-1 may be coupled with DC/DC converter 320-1, and SPE PHYs 315-2 and 316-2 may be coupled with DC/DC converter 320-2. DC/DC converters 320-1 and 320-2 may be representative of power converters (e.g., buck converters, boost converters, buck-boost converters) that can receive the fault-managed power from SPE 302 via DMCs 323-1 and 323-2, respectively, and convert the fault-managed power to a DC power. While not shown in operating environment 300, each of DC/DC converters 320-1 and 320-2 may be further coupled with a motor (e.g., motors 117). The conversion of the fault-managed power for driving the motors may depend on the type of motor, the operation mode of the motor, the load coupled with the motor, and the like. Microcontrollers 305-1 and 305-2 may be coupled with DC/DC converters 320-1 and 320-2, respectively, to control functionality of DC/DC converters 320-1 and 320-2.

Microcontrollers 305-1 and 305-2 are representative of one or more processors or processing units (e.g., microcontroller 214 of FIG. 2) capable of communicating with and controlling components of FMP receivers 115-1 and 115-2, respectively. For example, microcontroller 305-1 may be coupled with Ethernet switch 310-1 and DC/DC converter 320-1. Microcontroller 305-2 may be coupled with Ethernet switch 310-2 and DC/DC converter 320-2. Microcontrollers 305-1 and 305-2 may perform one or more predetermined, or pre-programmed, operations to communicate with and control such components. Microcontrollers 305-1 and 305-2 may also, or instead, receive user data that may direct microcontrollers 305-1 and 305-2 to perform such operations.

In operation, microcontroller 305-1 may direct SPE PHYs 315-1 and 316-1 to establish a continuous communication channel with SPE PHYs of the transmitter in response to a request to establish the continuous communication channel from the transmitter. Similarly, microcontroller 305-2 may direct SPE PHYs 315-2 and 316-2 to establish a continuous communication channel with the SPE PHYs of the transmitter. In some embodiments, microcontrollers 305-1 and 305-2 may also establish a continuous communication network with each other. The SPE PHYs of FMP receivers 115-1 and 115-2 may transmit communications through SPE 302 to the transmitter using low-voltage signals. Capacitors of FMP receivers 115-1 and 115-2 may allow communications to flow through respective CMCs and to SPE PHYs as the voltage of the communication signals may not surpass a threshold voltage.

Simultaneously, a transmitter may provide fault-managed power to FMP receivers 115-1 and 115-2 via SPE 302. In various examples, the transmitter provides the fault-managed power to FMP receivers 115-1 and 115-2 over SPE 302 as a pulsed signal. In other words, the transmitter generates a signal having a duty cycle less than 100%. In some examples, the signal may have a maximum duty cycle such as 75%. When using a pulsed signal, the transmitter may provide the fault-managed power in a way that mimics a pulse-width modulated signal. The communications between the transmitter and FMP receivers 115-1 and 115-2 may ride over the fault-managed power, but the communications may also persist despite breaks in the power transmission, such as when the pulsed signal is low (i.e., off).

Unlike the low-voltage signals, the fault-managed power may include a high-voltage signal. Thus, the capacitors of FMP receivers 115-1 and 115-2 may prevent the fault-managed power from traveling to SPE PHYs 315-1, 316-1, 315-2, and 316-2. DC/DC converters 320-1 and 320-2 may each receive the fault-managed power and convert the fault-managed power based on respective motors. Microcontrollers 305-1 and 305-2 may identify the amount of fault-managed power received by DC/DC converters 320-1 and 320-2, respectively, and the amount of expected power consumption by each motor coupled with DC/DC converters 320-1 and 320-2, respectively. The expected power consumption may refer to the amount of power to be used during operation of the motor. The expected power consumption of a motor coupled with DC/DC converter 320-1 may differ from the expected power consumption of a motor coupled with DC/DC converter 320-2. Microcontrollers 305-1 and 305-2 may communicate the expected power consumptions to the transmitter via SPE PHYs 315-1 and 316-1 and SPE PHYs 315-2 and 316-2, respectively.

The transmitter may perform a comparison between the total expected power consumption, the fault-managed power, and other expected losses throughout the system based on SPE 302, electrical components of the transmitter and FMP receivers 115-1 and 115-2, and the like. Based on the comparison, the transmitter may detect a fault in the transmitter, SPE 302, FMP receiver 115-1, or FMP receiver 115-2. If the transmitter detects a fault in any one of FMP receivers 115-1 or 301-2 or in a component of the transmitter, the transmitter may terminate transmission of the fault-managed power to FMP receivers 115-1 and 115-2. Accordingly, in this multi-drop topology, termination of the fault-managed power terminates power to both FMP receivers 115-1 and 115-2.

In other embodiments, a different number of receivers, a different number or type of components of FMP receivers 115-1 and 115-2, or a different topology may be employed. For example, FMP receivers 115-1 and 115-2 may include various components of FMP receiver 115 of FIG. 2. In a different topology, the transmitter may be individually coupled to each of FMP receivers 115-1 and 115-2, such that if the transmitter detects a fault in FMP receiver 115-1 but not in FMP receiver 115-2, the transmitter may terminate transmission of the fault-managed power to only FMP receiver 115-1.

Figure 4:
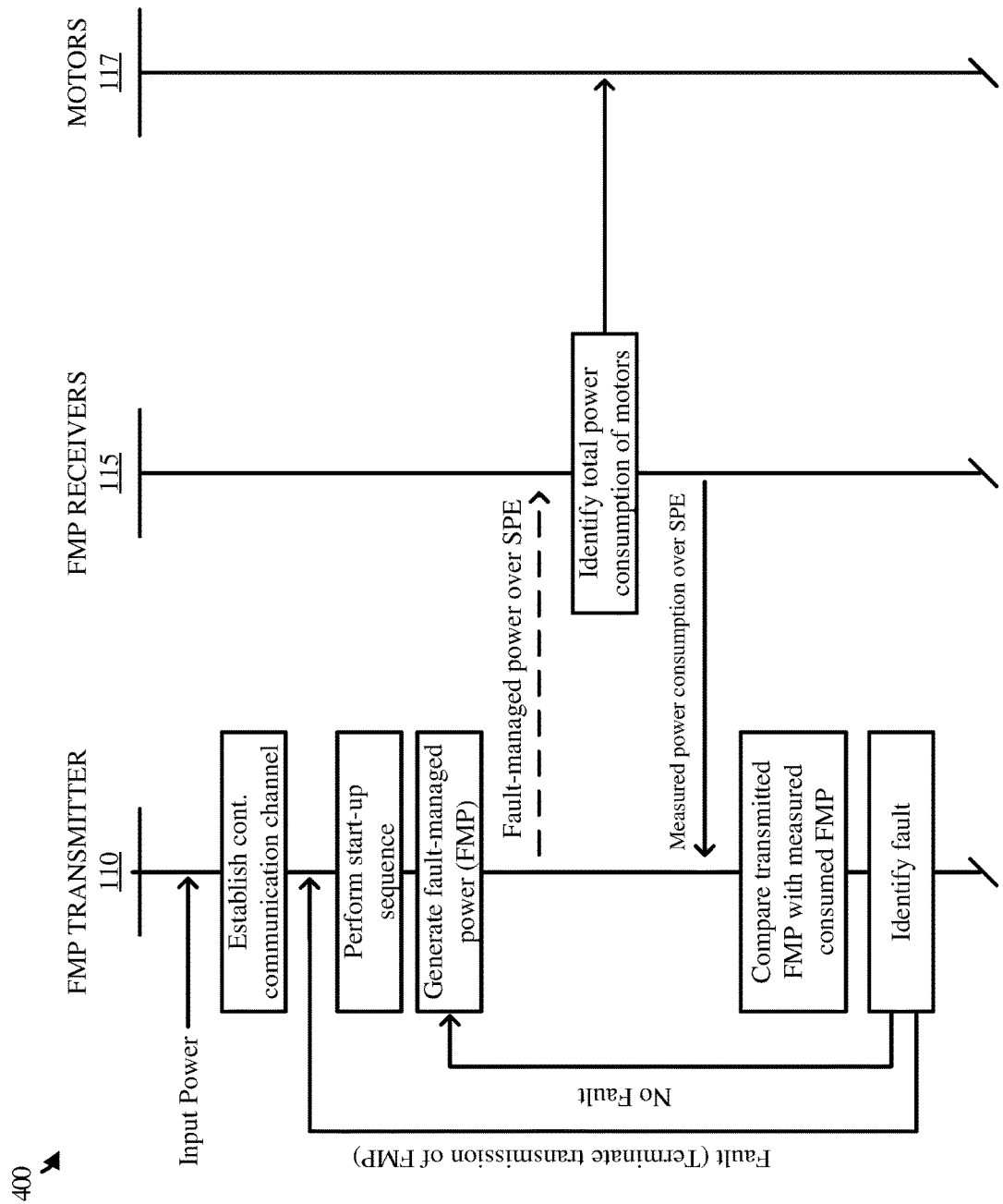
FIG. 4 illustrates an example sequence of events performable by elements of a fault-managed power system in accordance with some embodiments of the present technology.

FIG. 4 illustrates an example sequence of events performable by elements of a fault-managed power system in accordance with some embodiments of the present technology. FIG. 4 demonstrates operating environment 400, which includes FMP transmitter 110, FMP receivers 115, and motors 117.

FMP transmitter 110 is representative of a device, apparatus, or circuitry capable of receiving power from a power source (e.g., power source 105 of FIG. 1A), converting the power into fault-managed power, and transmitting the fault-managed power to FMP receivers 115 over a transmission link or line (e.g., SPE 112 of FIG. 1A). FMP transmitter 110 may further be capable of establishing a continuous communication channel with FMP receivers 115 via the transmission line for exchanging data signals between FMP transmitter 110 and FMP receivers 115. The input power provided to FMP transmitter 110 may be AC power, such as from AC mains, or DC power.

After receiving input power and prior to generating FMP, FMP transmitter 110 may produce low-voltage DC power and establish a continuous communication channel between FMP transmitter 110 and FMP receivers 115 for exchanging data signals between FMP transmitter 110 and FMP receivers 115 over SPE cabling. Data signals exchanged between the devices can ride over the FMP. Additionally, the data signals may be provided between the devices in accordance with a safety protocol (e.g., CIP Safety) to provide high integrity indication of line conditions with packet intervals that are quick enough to disable power quickly in the event of a fault.

FMP transmitter 110 may then perform a start-up sequence to initialize circuitry of FMP transmitter 110 (e.g., circuitry 111) and FMP receiver 115 (e.g., circuitry 116). The start-up sequence may begin when the input power is provided to FMP transmitter 110. A control AC-to-DC power converter (e.g., power converter 213 of FIG. 2), a low-voltage power converter (e.g., low-voltage isolated converter 224), and a microcontroller of FMP transmitter 110 (e.g., microcontroller 214) may turn on, and an FMP AC-to-DC power converter (e.g., FMP converter 219) may be disabled. The low-voltage power converter can transmit low-voltage DC power over single-pair Ethernet cable (SPE) (e.g., SPE 112, transmission line 226) to FMP receiver 115. SPE may include a single pair of conductors (i.e., wires) that connect FMP transmitter 110 to FMP receiver 115. The low-voltage power passes through an over-voltage switch (e.g., over-voltage switch 240) in FMP receiver 115 causing a control DC-to-DC converter (e.g., power converter 243) in FMP receiver 115 to turn on. Next, a microcontroller in FMP receiver 115 turns on (e.g., microcontroller 235).

After low-voltage signals are flowing through both FMP transmitter 110 and FMP receiver 115, the microcontroller of FMP transmitter 110 measures the voltage and current flowing through wires of FMP transmitter 110. If the microcontroller determines that the voltage and current are above threshold values, the microcontroller can disable the control AC-to-DC power converter and the low-voltage power converter to prevent damage to either FMP transmitter 110 or FMP receiver 115. The microcontroller may wait an amount of time, then attempt to begin the start-up sequence again. If the microcontroller determines that the voltage and current are within threshold values, the microcontroller can establish a communication channel between FMP transmitter 110 and FMP receiver 115 via SPE physical layers (PHYs) (e.g., SPE PHYs 215 and 234). The communication channel may form a black channel by which FMP transmitter 110 and FMP receiver 115 can communicate in accordance with a safety protocol (e.g., CIP). At this time, the microcontroller of FMP receiver 115 can measure the line voltage and current flowing through components of FMP receiver 115 and safely communicate these measurements to FMP transmitter 115 via the SPE. The microcontroller of FMP transmitter 110 can compare the measurements from FMP receiver 115 to threshold values and determine whether there is a fault at FMP receiver 115. If so, FMP transmitter 110 can stop transmission of the low-voltage DC power to FMP receiver 115. If not, FMP transmitter 110 can enable the FMP AC-to-DC converter to begin generating the FMP.

FMP transmitter 110 may include one or more components (e.g., circuitry 111) capable of generating the FMP and providing the FMP to FMP receivers 115. In various examples, FMP transmitter 110 provides the FMP over the SPE (e.g., SPE 112). Both conductors of the SPE may be used to transmit the fault-managed power from FMP transmitter 110 to FMP receiver 115 and to transmit data and communications simultaneously (e.g., user data 212 of FIG. 2), expected power consumption, and other information communicable via physical layers (e.g., SPE PHYs 215 and 234 of FIG. 2). With SPE, full-duplex communications (i.e., communication in both directions) can occur as electrical signals transmitted over the conductors may be superimposed over power signals. In various examples, echo cancellation techniques may be used by FMP transmitter 110 and FMP receiver 115 so that signals leaving a respective SPE PHY do not return to the same SPE PHY's receiver circuitry. Therefore, the FMP can be transmitted to FMP receivers 115 safely over low-voltage cables as opposed to conventional commercial transmission line cabling. The FMP generated by FMP transmitter 110 may differ from the input power. For example, FMP transmitter 110 may generate a FMP that is of a higher or lower voltage than the input power or of a different type (i.e., DC power).

In various examples, FMP transmitter 110 may provide the FMP to FMP receivers 115 over the SPE as a pulsed signal (i.e., less than 100% duty cycle). More specifically, the pulsed signal may have a duty cycle of 75% or less. This may allow FMP transmitter 110 to provide power to FMP receivers 115 that functions like a pulse-width modulated signal for use by motors 117 coupled to FMP receivers 115.

FMP receivers 115 may include one or more components (e.g., circuitry 116) capable of receiving the FMP and driving motors 117 with the FMP. The components of FMP receivers 115 may also be configured to determine an expected power consumption of motors 117. FMP receivers 115 may include one or more receiver circuits, and each receiver circuit may be coupled with a motor (e.g., motors 117).

Motors 117 are representative of any type of motor used in an industrial automation, industrial, or commercial environment. For example, motors 117 may include DC motors, AC motors, or any variation thereof, such as a DC brushless motor (e.g., motors 117 of FIG. 1A). Each receiver is coupled with an individual motor. In various examples, motors 117 may use DC power to operate. Accordingly, FMP receivers 115 can convert the fault-managed power to a DC power usable by motors 117.

FMP receivers 115 can identify expected power consumption by motors 117. This may entail summing the expected power consumption of each individual motor to determine a total expected power consumption among motors 117. FMP receivers 115 can further measure voltage and current of the FMP transmitted to FMP receivers 115. FMP receivers 115 can transmit such measurements over the continuous communication channel to FMP transmitter 110. In some examples, FMP receivers 115 may transmit these measurements within a certain, pre-determined amount of time (i.e., in accordance with a watchdog timer of FMP transmitter 110) or else FMP transmitter 110 can detect a fault with FMP receivers 115.

FMP transmitter 110 can perform a comparison between the voltage and current of the FMP transmitted to FMP receivers 115, the voltage and current of the FMP received at FMP receivers 115, the power consumption of the loads, and any loss or dissipation in the transmission. If FMP transmitter 110 determines that the differences exceed threshold voltage and current values, FMP transmitter 110 can identify a fault. The fault may include one or more of a line-to-line fault, a line-to-ground fault, a malfunction in FMP transmitter 110 or FMP receivers 115, over-current, short-circuit, or any other issue that could cause shock or fire to people, structures, or components of an industrial or commercial environment, among other things. In response to identifying the fault, FMP transmitter 110 can terminate transmission of the FMP to FMP receivers 115. This may entail disabling or turning off a component capable of generating the FMP, opening one or more switches to prevent current from flowing through the SPE, or blocking the flow of the FMP from FMP transmitter 110 to FMP receivers 115 by using one or more transistors, diodes, or other electrical elements. Subsequently, FMP transmitter 110 may initiate the start-up sequence again and begin the transmission of the FMP after the fault has been resolved.

If there is not a fault, however, FMP transmitter 110 can continue to generate the FMP and provide the FMP to FMP receiver 115. In some cases, this may entail generating new instances of the FMP and performing the sequence described herein repeatedly unless or until a fault is detected by FMP transmitter 110.

Figure 5:
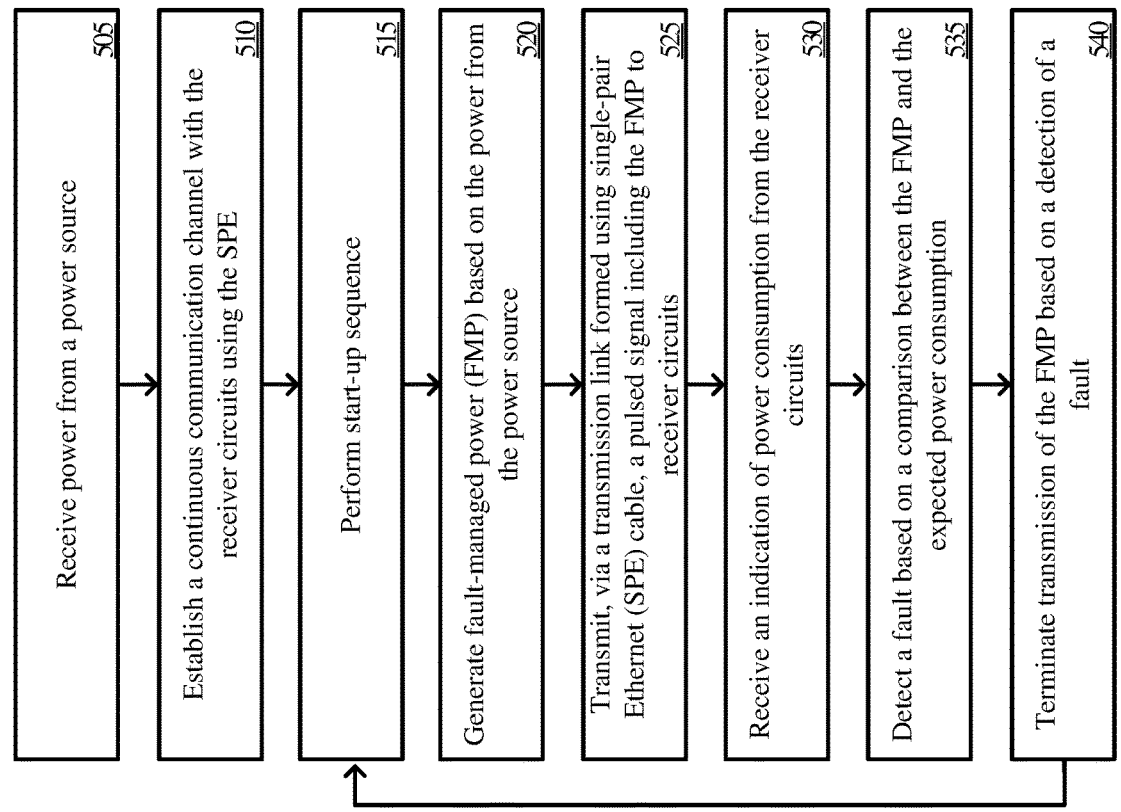
FIG. 5 illustrates a series of steps for detecting faults within a fault-managed power system in accordance with some embodiments of the present technology.

FIG. 5 illustrates a series of steps for detecting faults within a fault-managed power system in accordance with some embodiments of the present technology. FIG. 5 includes process 500, which references elements of operating environment 100 of FIG. 1A. In various examples, process 500 may be implemented in hardware, software, firmware, or any combination or variation. For example, process 500 may be implemented in circuitry 111 of FMP transmitter 110 and/or circuitry 116 of FMP receivers 115.

In operation 505, FMP transmitter 110 receives power from power source 105. Power source 105 is representative of any alternating current (AC) or direct current (DC) power source. For example, power source 105 may be AC mains electricity or a DC source, such as a rectifier or fuel cell. In some examples, power source 105 may produce power categorized under Class 1 power of the NEC. Power source 105 may be coupled to FMP transmitter 110, or circuitry 111 of FMP transmitter 110, to provide power to FMP transmitter 110.

FMP transmitter 110 is representative of a device, apparatus, or circuitry capable of receiving power from power source 105, converting the power into fault-managed power, and transmitting the fault-managed power to FMP receivers 115 over a transmission link or line (SPE 112).

In operation 510, FMP transmitter 110 establishes a continuous communication channel with FMP receivers 115 using SPE 112. SPE 112 may include a pair of conductors (i.e., wires). The pair of conductors may be used to transmit the fault-managed power from FMP transmitter 110 to FMP receivers 115 and exchange communications between FMP transmitter 110 and FMP receivers 115. The continuous communication channel may be used to exchange data signals between FMP transmitter 110 and FMP receivers 115, such as the expected power consumption identified by FMP receivers 115. Communications and data between FMP transmitter 110 and FMP receivers 115 can transmit directly over the fault-managed power continuously, allowing FMP transmitter 110 to determine whether a fault has occurred at any point during transmission and reception of the fault-managed power.

In operation 515, FMP transmitter 110 establishes a continuous communication channel with FMP receivers 115 using SPE 112. FMP receivers 115 are representative of devices, apparatuses, or circuitry capable of receiving power from FMP transmitter 110, converting the power into power usable by motors 117, and determining an expected power consumption by motors 117. In some embodiments, FMP receivers 115 may be arranged in a multi-drop topology with respect to FMP transmitter 110. In other embodiments, FMP receivers 115 may be arranged in a linear topology with respect to FMP transmitter 110, a star topology with respect to FMP transmitter 110, or a ring topology. The continuous communication channel may be used to exchange data signals between FMP transmitter 110 and FMP receivers 115, such as the expected power consumption identified by FMP receivers 115. Communications and data between FMP transmitter 110 and FMP receivers 115 can transmit directly over the fault-managed power continuously, allowing FMP transmitter 110 to determine whether a fault has occurred at any point during transmission and reception of the fault-managed power.

Prior to generating fault-managed power, in operation 515, FMP transmitter 110 performs a start-up sequence to initialize circuitry of FMP transmitter 110 (e.g., circuitry 111) and FMP receivers 115 (e.g., circuitry 116). The start-up sequence may begin when the input power is provided to FMP transmitter 110. A control AC-to-DC power converter (e.g., power converter 213 of FIG. 2), a low-voltage power converter (e.g., low-voltage isolated converter 224), and a microcontroller of FMP transmitter 110 (e.g., microcontroller 214) may turn on, and an FMP AC-to-DC power converter (e.g., FMP converter 219) may be disabled. The low-voltage power converter can transmit low-voltage DC power over single-pair Ethernet cable (SPE) (e.g., SPE 112, transmission line 226) to FMP receiver 115. SPE may include a single pair of conductors (i.e., wires) that connect FMP transmitter 110 to FMP receiver 115. The low-voltage power passes through an over-voltage switch (e.g., over-voltage switch 240) in FMP receiver 115 causing a control DC-to-DC converter (e.g., power converter 243) in FMP receiver 115 to turn on. Next, a microcontroller in FMP receiver 115 turns on (e.g., microcontroller 235).

After low-voltage signals are flowing through both FMP transmitter 110 and FMP receiver 115, the microcontroller of FMP transmitter 110 measures the voltage and current flowing through wires of FMP transmitter 110. If the microcontroller determines that the voltage and current are above threshold values, the microcontroller can disable the control AC-to-DC power converter and the low-voltage power converter to prevent damage to either FMP transmitter 110 or FMP receiver 115. The microcontroller may wait an amount of time, then attempt to begin the start-up sequence again. If the microcontroller determines that the voltage and current are within threshold values, the microcontroller can establish a communication channel between FMP transmitter 110 and FMP receiver 115 via SPE physical layers (PHYs) (e.g., SPE PHYs 215 and 234). The communication channel may form a black channel by which FMP transmitter 110 and FMP receiver 115 can communicate in accordance with a safety protocol (e.g., CIP). At this time, the microcontroller of FMP receiver 115 can measure the line voltage and current flowing through components of FMP receiver 115 and safety communicate these measurements to FMP transmitter 115 via the SPE. The microcontroller of FMP transmitter 110 can compare the measurements from FMP receiver 115 to threshold values and determine whether there is a fault at FMP receiver 115. If so, FMP transmitter 110 can stop transmission of the low-voltage DC power to FMP receiver 115. If not, FMP transmitter 110 can enable the FMP AC-to-DC converter to begin generating the FMP.

In operation 520, FMP transmitter 110 generates a fault-managed power based on the power from power source 105. FMP transmitter 110 includes circuitry 111, representative of various electronic and electro-mechanical elements capable of interfacing with power source 105, to convert the power from power source 105 to DC power or to AC power and generate fault-managed power from the DC or AC power. In various examples, circuitry 111 may include a microcontroller, one or more power converters, transformers, diodes, resistors, capacitors, and the like. The microcontroller may include one or more processors or processing units capable of communicating with FMP receivers 115, transmitting data and power to FMP receivers 115, and detecting a fault within FMP transmitter 110 or FMP receivers 115 during transmission of the fault-managed power. Examples of such processor(s) may include microcontrollers, DSPs, general purpose central processing units, application specific processors or circuits (e.g., ASICs), and logic devices (e.g., FPGAs), as well as any other type of processing device, combinations, or variations thereof.

In operation 525, FMP transmitter 110 transmits, via a transmission link formed using SPE 112, a pulsed signal including the fault-managed power to FMP receivers 115. In various examples, FMP transmitter 110 provides the fault-managed power to FMP receivers 115 over SPE 112 as a pulsed signal. In other words, FMP transmitter 110 generates a signal having a duty cycle less than 100%. In this way, FMP transmitter 110 provides the fault-managed power in a way that mimics a pulse-width modulated signal.

To measure the amount of fault-managed power received and the amount of power to be consumed by motors 117, FMP receivers 115 may include circuitry 116. Circuitry 116 is representative of various electronic and electro-mechanical elements capable of interfacing with motors 117, converting the fault-managed power to power appropriate for each of motors 117, and communicating expected power consumption by motors 117 to FMP transmitter 110. In various examples, circuitry 116 may include a microcontroller, one or more power converters, transformers, diodes, resistors, capacitors, and the like. The microcontroller may include one or more processors or processing units capable of communicating with FMP transmitter 110 and transmitting data to FMP transmitter 110 during transmission of the fault-managed power. Examples of such processor(s) may include microcontrollers, DSPs, general purpose central processing units, application specific processors or circuits (e.g., ASICs), and logic devices (e.g., FPGAs), as well as any other type of processing device, combinations, or variations thereof.

In operation 530, FMP transmitter 110 receives an indication of power consumption from FMP receivers 115 over the continuous communication channel via SPE 112. FMP transmitter 110 can compare measurements of the fault-managed power sensed by circuitry 111 with measurements sensed by circuitry 116 of FMP receivers 115. In operation 535, FMP transmitter 110 can detect a fault based on this comparison. In some examples, FMP transmitter 110 uses pre-determined threshold values in its comparison. However, in other examples, FMP transmitter 110 can dynamically determine threshold values based on fluctuations in power consumption by motors 117, for instance.

Following detection of a fault, such as a line-to-line or line-to-ground fault, FMP transmitter 110, in operation 540, terminates transmission of the fault-managed power to FMP receivers 115, such that FMP receivers 115 and motors 117 coupled to FMP receivers 115 no longer receive the fault-managed power until FMP transmitter 110 initiates transmission again from operation 510. In some cases, FMP transmitter 110 waits a pre-determined amount of time before re-transmitting. In other cases, FMP transmitter 110 may re-transmit the fault-managed power after a user manually resets FMP transmitter 110 and/or FMP receivers 115. However, prior to re-transmitting the fault-managed power, FMP transmitter 110 may perform the start-up sequence again as in operation 515, then proceed to perform subsequent operations of process 800. If no fault is detected at any point, FMP transmitter 110 may continuously provide fault-managed power to FMP receivers 115. This may entail generating new instances of the fault-managed power, as in operation 520, and continuing to monitor for faults while repeatedly performing operations 525 and 530.

Figure 6:
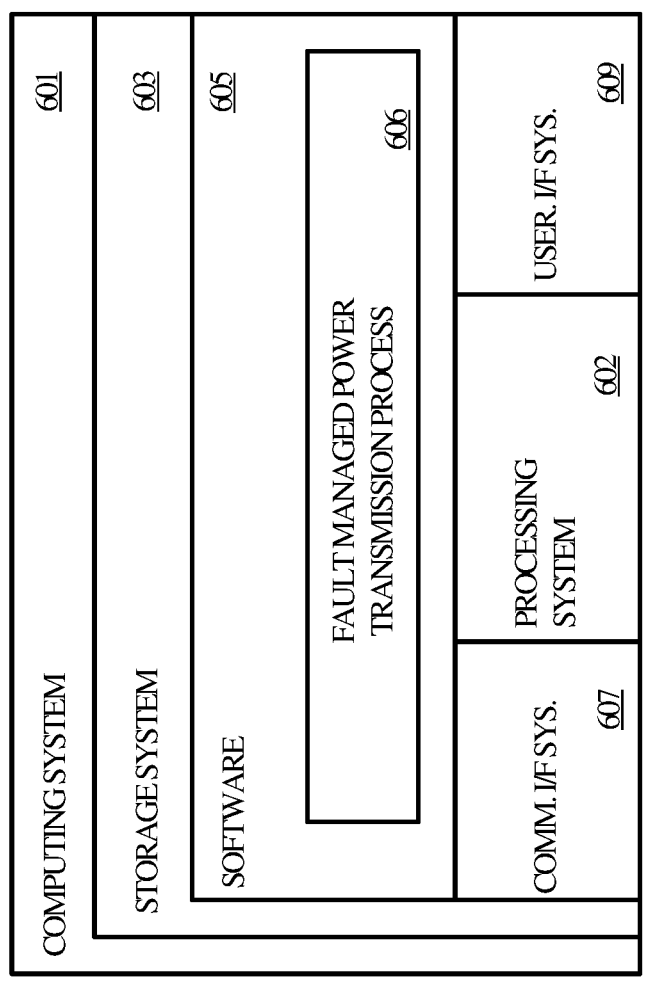
FIG. 6 illustrates an example computing system used in some embodiments of the present technology.

FIG. 6 illustrates computing system 601 to perform fault-managed power (FMP) generation and transmission according to an implementation of the present technology. Computing system 601 is representative of any system or collection of systems with which the various operational architectures, processes, scenarios, and sequences disclosed herein for device health collection and configuration may be employed. Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609 (optional). Processing system 602 is operatively coupled with storage system 603, communication interface system 607, and user interface system 609. Computing system 601 may be representative of a cloud computing device, distributed computing device, or the like.

Processing system 602 loads and executes software 605 from storage system 603. Software 605 includes and implements FMP transmission process 606, which is representative of any of the fault-managed power generation, conversion, transmission, analysis, and other processes discussed with respect to the preceding Figures. When executed by processing system 602 to provide FMP functions, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Components of processing system 502 may include safety-certified features, such as 1 out of 2 (1002) architecture. Processing system 602 may be implemented within a single processing device but may also be distributed across multiple processing devices or sub-systems that cooperate in executing program instructions. Examples of processing system 602 include general purpose central processing units, graphical processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including FMP process 606) may be implemented in program instructions and among other functions may, when executed by processing system 602, direct processing system 602 to operate as described with respect to the various operational scenarios, sequences, and processes illustrated herein. For example, software 605 may include program instructions for implementing a device health metrics process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to provide device health metrics and contextualization and instantiation thereof as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein,"

"above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A fault-managed power system, comprising:
   a transmitter circuit coupled to receive power from a power source and configured to:
   generate a fault-managed power based on the power from the power source;
   transmit a pulsed signal comprising the fault-managed power to one or more receiver circuits via a transmission link formed using a single-pair Ethernet cable;
   establish a continuous communication channel with the one or more receiver circuits using the single-pair Ethernet cable for exchanging data signals;
   receive an indication of power consumption from the one or more receiver circuits via the continuous communication channel;
   detect a fault based on a comparison between the transmitted fault-managed power and the power consumption; and
   terminate, in response to detecting the fault, transmission of the fault-managed power to the one or more receiver circuits; and
   the one or more receiver circuits, wherein each of the one or more receiver circuits is coupled to the transmitter circuit via the single-pair Ethernet cable and to a motor in an industrial automation environment, and wherein each of the one or more receiver circuits is configured to drive a respective motor using the fault-managed power.

2. The fault-managed power system of claim 1, wherein the pulsed signal has a maximum duty cycle less than one hundred percent (100%).

3. The fault-managed power system of claim 1, wherein each of the one or more receiver circuits is further configured to measure current of the respective motor driven by the fault-managed power, and wherein the power consumption is determined based on the measured current.

4. The fault-managed power system of claim 1, wherein the transmitter circuit comprises a transmitter physical layer and each of the receiver circuits comprise a receiver physical layer, and wherein the continuous communication channel is established between the transmitter physical layer and the receiver physical layers.

5. The fault-managed power system of claim 1, wherein the data signals are exchanged via the continuous communication channel in accordance with a safety protocol, and wherein the safety protocol is one of a common industrial protocol (CIP) and a black-channel safety protocol.

6. The fault-managed power system of claim 5, wherein each of the receiver circuits is configured to provide the power consumption via the continuous communication channel with a packet transmission speed in accordance with the safety protocol.

7. The fault-managed power system of claim 1, wherein the transmitter circuit is further configured to detect the fault based on a delay in receiving the indication of the power consumption from the one or more receiver circuits beyond a threshold time.

8. The fault-managed power system of claim 1, wherein the fault-managed power is Class 4 power.

9. The fault-managed power system of claim 1, wherein the detected fault is one of a line-to-line fault and a line-to-ground fault.

10. The fault-managed power system of claim 1, wherein the power includes either alternating-current (AC) power or direct current (DC) power.

11. The fault-managed power system of claim 1, wherein the one or more receiver circuits are arranged in either a multi-drop configuration or a linear configuration relative to the transmitter circuit.

12. The fault-managed power system of claim 1, wherein a receiver circuit of the one or more receiver circuits comprises a terminator.

13. The fault-managed power system of claim 1, wherein each of the receiver circuits comprises converter circuitry configured to convert the fault-managed power into a motor power and an interface configured to provide the motor power to the respective motor of the receiver circuit.

14. A method, comprising:
- receiving, by a fault-managed power transmitter, power from a power source;
- generating, by the fault-managed power transmitter, a fault-managed power based on the power from the power source;
- transmitting, via a transmission link formed using a single-pair Ethernet cable, a pulsed signal comprising the fault-managed power to one or more fault-managed power receivers;
- establishing, by the fault-managed power transmitter, a continuous communication channel with the one or more fault-managed power receivers using the single-pair Ethernet cable for exchanging data signals;
- receiving, at the fault-managed power transmitter, an indication of power consumption from the one or more fault-managed power receivers via the continuous communication channel;
- detecting, by the fault-managed power transmitter, a fault based on a comparison between the transmitted fault-managed power and the power consumption; and
- terminating, by the fault-managed power transmitter, in response to detecting the fault, transmission of the fault-managed power to the one or more fault-managed power receivers.

15. The method of claim 14, wherein each of the one or more fault-managed power receivers is coupled to a motor in an industrial automation environment, and wherein each of the one or more fault-managed power receivers is configured to drive a respective motor using the fault-managed power.

16. The method of claim 15, further comprising measuring current of the motors driven by the fault-managed power, wherein the power consumption is determined based on the measured currents.

17. The method of claim 14, wherein the pulsed signal has a maximum duty cycle of less than one hundred percent (100%).

18. The method of claim 14, wherein exchanging the data signals via the continuous communication channel occurs in accordance with a safety protocol, and wherein the safety protocol is one of a common industrial protocol (CIP) and a black-channel safety protocol.

19. The method of claim 18, wherein receiving the indication of the power consumption occurs with a packet transmission speed in accordance with the safety protocol.

20. The method of claim 14, wherein detecting the fault is further based on identifying a delay in receiving the indication of the power consumption from the one or more fault-managed power receivers beyond a threshold time.

* * * * *